United States Patent
Chen et al.

(10) Patent No.: US 8,727,939 B2
(45) Date of Patent: May 20, 2014

(54) HYBRID ELECTRIC DRIVE UNIT, HYBRID DRIVE SYSTEM AND CONTROL METHOD THEREOF

(75) Inventors: Hong Chen, Shanghai (CN); Zhixin Chen, Shanghai (CN); Weimin Gao, Shanghai (CN); Jun Zhu, Shanghai (CN); Sidong Luo, Shanghai (CN); Hailong Ge, Shanghai (CN); Jian Wang, Shanghai (CN); Yanglong Chen, Shanghai (CN)

(73) Assignee: Saic Motor Corporation Ltd, Shanghai (CN)

( * ) Notice: Subject to any disclaimer, the term of this patent is extended or adjusted under 35 U.S.C. 154(b) by 204 days.

(21) Appl. No.: 13/513,843

(22) PCT Filed: Nov. 30, 2010

(86) PCT No.: PCT/CN2010/001919
§ 371 (c)(1),
(2), (4) Date: Aug. 16, 2012

(87) PCT Pub. No.: WO2011/066717
PCT Pub. Date: Jun. 9, 2011

(65) Prior Publication Data
US 2013/0005529 A1    Jan. 3, 2013

(30) Foreign Application Priority Data
Dec. 4, 2009   (CN) .......................... 2009 1 0199960

(51) Int. Cl.
*F16H 3/091*   (2006.01)
(52) U.S. Cl.
USPC .................................. 477/5; 74/329
(58) Field of Classification Search
USPC ...................... 477/5; 475/5, 303; 74/325, 329;
180/65.21
See application file for complete search history.

(56) References Cited

U.S. PATENT DOCUMENTS

| 4,335,429 A * | 6/1982 | Kawakatsu ................... 701/102 |
| 6,427,549 B1 * | 8/2002 | Bowen ............................ 74/331 |

(Continued)

FOREIGN PATENT DOCUMENTS

| CN | 1827412 A | | 9/2006 |
| CN | 1919632 A | | 2/2007 |
| CN | 101314325 A | | 12/2008 |
| CN | 101342859 A | * | 1/2009 |
| CN | 101342895 A | | 1/2009 |

OTHER PUBLICATIONS

English translation of CN101342859A, Feb. 6, 2014, http://translationalportal.epo.org.*

(Continued)

*Primary Examiner* — Roger Pang
(74) *Attorney, Agent, or Firm* — Brinks Gilson Lione

(57) ABSTRACT

A series/parallel hybrid electric drive unit for vehicle comprises an engine (1), a main traction motor (2), an integrated starter-generator (3), a differential (4), a first shaft (main shaft) (5), a first stage decelerating device (9), a second stage decelerating device (10), a first clutch (6), a second clutch (7) and a synchronizer (8). The synchronizer (8) is slidably arranged on the first shaft (5) which is connected to the first stage decelerating device (9) or the second stage decelerating device (10) by the synchronizer (8), respectively. The hybrid electric drive unit of the invention has a compactly-arranged internal structure and an efficient and appropriate internal connection, and a switch between connection and disconnection of respective hybrid power sources and wheels and a shifting among operating modes and gear positions of the hybrid drive system can be realized.

22 Claims, 3 Drawing Sheets

(56) References Cited

U.S. PATENT DOCUMENTS

| | | | |
|---|---|---|---|
| 6,490,945 B2 * | 12/2002 | Bowen | 74/339 |
| 2004/0147365 A1 * | 7/2004 | Komeda et al. | 477/6 |
| 2009/0242287 A1 * | 10/2009 | Eritate et al. | 180/65.22 |
| 2009/0250278 A1 * | 10/2009 | Kawasaki et al. | 180/65.275 |
| 2013/0102430 A1 * | 4/2013 | He et al. | 475/5 |
| 2013/0225349 A1 * | 8/2013 | Puiu et al. | 475/5 |

OTHER PUBLICATIONS

International Search Report from corresponding PCT Application No. PCT/CN2010/001919, dated Feb. 24, 2011, 5 pages.

* cited by examiner

| Operating mode | First clutch | Second clutch | Synchronizer | Engine | Integrated starter-generator | Main traction motor |
|---|---|---|---|---|---|---|
| neutral gear parking mode | disengaged | disengaged | disengaged | stop operating | stop operating | stop operating |
| stop-to-charge mode | disengaged | disengaged | disengaged | output power | ignite the engine first, then operate as a generator | stop operating |
| pure electric drive first gear mode | disengaged or engaged | engaged | engaged | stop operating | stop operating or operate | output power |
| pure electric drive second gear mode | disengaged or engaged | engaged | engaged | stop operating | stop operating or operate | output power |
| hybrid parallel drive first gear mode | engaged | engaged | engaged | operate | one of the integrated starter-generator and the main traction motor outputs power | one of the main traction motor and the integrated starter-generator outputs power |
| hybrid parallel drive second gear mode | engaged | engaged | engaged | operate | one of the integrated starter-generator and the main traction motor outputs power | one of the main traction motor and the integrated starter-generator outputs power |
| rapid acceleration first gear mode | engaged | engaged | engaged | output power | output power | output power |
| rapid acceleration second gear mode | engaged | engaged | engaged | output power | output power | output power |
| charge-in-travelling series operation first gear mode | disengaged | engaged | engaged | drive the integrated starter-generator | generator | output power |
| charge-in-travelling series operation second gear mode | disengaged | engaged | engaged | drive the integrated starter-generator | generator | output power |
| charge-in-travelling parallel operation first gear mode | engaged | engaged | engaged | output power | generator | output power |
| charge-in-travelling parallel operation second gear mode | engaged | engaged | engaged | output power | generator | output power |
| braking deceleration energy recycling | without restriction | without restriction | without restriction | without restriction | generator or stop operating | generator or stop operating |

Fig. 3

HYBRID ELECTRIC DRIVE UNIT, HYBRID DRIVE SYSTEM AND CONTROL METHOD THEREOF

RELATED APPLICATIONS

This application claims the benefit under 35 U.S.C. §371 of International Patent Application No. PCT/CN2010/001919, having an international filing date of Nov. 30, 2010, which claims priority to Chinese Patent Application No. 200910199960.4, filed Dec. 4, 2009, the contents of all of which are incorporated herein by reference in their entirety.

FIELD OF THE INVENTION

The present invention relates to a hybrid vehicle, in particular a plug-in hybrid vehicle, and more specifically to a hybrid drive unit for vehicle with clutches and a synchronizer coupled in power transmission relationship for shifting, and a corresponding hybrid drive system as well as a driving and shifting method preferably corresponding to the hybrid drive unit and system.

BACKGROUND OF THE INVENTION

Since energy saving and environmental protection currently become the main focus in the development of automobile industry, hybrid vehicles have been turned into a main core technology and pursued by many automobile manufactures globally. Wherein, the solution of plug-in hybrid vehicles, except pure electric drive vehicles, is one of the most fuel saving solutions, and it has being advocated by many major automobile manufacturers. A plug-in hybrid vehicle primarily consists of a relative lower displacement engine and one or two motors. Under normal conditions, the motor(s) is responsible for providing pure electric power output and braking recycling energy when the power battery energy and power in relative high, achieving engine starting when the power battery energy and power drop to a preset value, and generating electricity or directly involving in the power drive, and the like.

In the current existing technology, the engine and the motor(s) in the above-mentioned plug-in type hybrid drive system are coupled mostly by the following ways:

I. Solution with planetary gear for power coupling and electric variable transmission for shifting: For example, Volt hybrid concept vehicle provided by GM is a plug-in hybrid electric vehicle, and the batteries in the hybrid drive system can be charged by using the outlet of household power supply (e.g. 110V/220V). The plug-in hybrid vehicle can provide a longer pure electrically-driven travelling distance than a full hybrid electric vehicle. The power coordination and variable speed can be realized by connecting the engine and two motors by means of a planetary gear set, and using torque spliting principle, so as to meet the demand of the running of the whole car. The change of the speed ratio is realized by controlling the speed of the integrated starter-generator. However, this method is complex in power transmission path, and there is a phenomenon that power transmission loss is caused unnecessarily by converting mechanical energy into electric energy and then converting the converted electric energy into mechanical energy to output. Therefore, if this method is applied for a plug-in hybrid vehicle, it will lead to the loss of efficiency of the hybrid mode of the hybrid drive vehicle. In addition, since all output power is output by planetary gear carrier of the planetary line, the requirements for the costs on material and the manufacturing of the planet gear carrier are very high.

II. Solution with single clutch for power coupling and without shifting: F3DM type hybrid vehicle is launched by BYD Holding Ltd., in which a relatively simple connection manner is used (referring to CN patent application No. 200610141069.1, entitled "DRIVE DEVICE FOR HYBRID VEHICLE"). An engine and a starting-generating integrated machine are linked together and then they are connected with another main motor via a clutch and connected directly to the input shaft of a differential via a main decelerator. This method is simple in structure, and under ideal operational condition power is transmitted directly and therefore the transmission efficiency is high. However, under the condition that a vehicle is in pure electric drive, it is very difficult to meet all design requirements in terms of climbing, acceleration performance and maximum electric travelling speed simultaneously, because the vehicle is driven directly by the main decelerator. In general, a large torque and high speed motor must be employed, that makes the demands on functions of electronic (electric) power controller and battery system for matching with the motor increase accordingly. Even so, it is very difficult to ensure the motor could often operate in a higher efficiency region under the urban traveling condition. In addition, in case when the energy of battery is low, so it is required to change into motor/engine hybrid travelling mode, but due to restrictions on minimum stable rotation speed and torque characteristics of engine, the engine will only be able to operate in a way like that in the above-mentioned series mode in many travelling conditions, such as driving at intermediate or low speed on urban road and ramp road, thus reducing energy utilization efficiency greatly.

SUMMARY OF THE INVENTION

In viewing of the deficiencies in the current existing technology, one object of the present invention is to provide a hybrid drive unit for vehicle with clutches and a synchronizer coupled in power transmission relationship for shifting, as well as a corresponding drive system and control method, by means of making improvements on the structure and the connection arrangement of hybrid drive system.

The above object and other objects of the present invention are achieved by the technical solutions recited in the appended claims.

According to the present invention, it provides a hybrid electric drive unit for vehicle with two clutches and a synchronizer assembled for shifting, which comprises a main traction motor, a integrated starter-generator, a differential, a first shaft (i.e. main shaft), a first clutch, a second clutch, a synchronizer, a first stage decelerating device, a second stage decelerating device, and a drive disc of the first clutch is connected to the integrated starter-generator and an engine of vehicle, a driven disc of the first clutch is connected to the first shaft, a drive disc of the second clutch is connected to the main traction motor, a driven disc of the second clutch is connected to the first shaft, the synchronizer is connected respectively to the first and second stage decelerating devices through which the hybrid electric drive unit outputs power, and is characterized in that the hybrid electric drive unit further comprises a synchronizer which is slidably arranged on the first shaft, and the first shaft is connected respectively to the first or second stage decelerating device via the synchronizer.

According to the present invention, it provides a hybrid electric drive system for vehicle with two clutches and a synchronizer for shifting, which comprises a first shaft, a first clutch, a second clutch, a first stage decelerating device, a second stage decelerating device, a main traction motor, a integrated starter-generator and an engine, and further comprises a synchronizer, a first gear drive gear, a second gear drive gear, a second gear driven gear, a drive disc of the first clutch of the hybrid drive system is connected to the engine and a rotor support of the integrated starter-generator, a driven disc of the first clutch is connected to one end of the first shaft, a drive disc of the second clutch of the hybrid drive system is connected to a rotor support of the main traction motor, a driven disc of the second clutch is connected to the other end of the first shaft, and the first shaft is connected sequentially to the first gear drive gear (i.e. the first stage drive gear of the first stage decelerating device) via the synchronizer, the first stage driven gear is connected to the differential of vehicle, the first shaft is connected sequentially to the second gear drive gear (i.e. the second stage drive gear of the second stage decelerating device) via the synchronizer, and the second stage driven gear is connected to the driven gear of the first stage decelerating device and the differential of vehicle via the second gear shaft.

According to a further aspect of the present invention, a control strategy for shifting and a method for controlling hybrid modes, based on the structure of the above-mentioned hybrid electric drive system for vehicle with two clutches and a synchronizer coupled in power transmission relationship for shifting, are provided. The control strategy and method can realize the power unit having a high-quality non-power shifting, providing many operating modes including at least a neutral gear parking mode, a stop-to-charge mode, a rapid acceleration and gear shift mode, a pure electric drive and gear shift mode, a hybrid parallel drive and gear shift mode, a charge-in-travelling series operation and gear shift mode, a charge-in-travelling parallel operation and gear shift mode, and a braking deceleration energy recycling mode.

The hybrid drive unit provided by the present invention can be designed and manufactured as a separate working component of hybrid vehicle. For example, it can be provided to complete vehicle manufacturers as a separate component for realizing integration.

By means of a simple and effective design, the hybrid drive system provided by the present invention can realize a series/parallel power output of hybrid vehicle by taking advantage of selective power outputs of the engine and two motors properly, and can switch among different operating modes based on different road conditions and battery volumes, so as to achieve energy saving and environment protection for hybrid vehicle and meet demands on system performances as required under different road conditions. At least on the basis of current existing technology, the present invention provides a hybrid drive system which consists of a first shaft, a first clutch, a second clutch, a synchronizer, a first stage decelerating device, a second stage decelerating device, a first gear drive gear, a second gear drive gear, a main traction motor, a integrated starter-generator, an engine and other components, etc., so that a proper connection of individual power sources is realized in the hybrid drive system. Moreover, by means of the arrangement of two clutches, a synchronizer and individual gear shafts, the power source of the main traction motor and transmission components of the hybrid electric drive unit are connected in a proper and compact manner, so as to realize a switch between connection and disconnection of individual hybrid sources and wheel, and operating modes of the hybrid drive system.

Furthermore, by means of the designs such as the arrangement of the first and second clutches within the space formed by the rotor support of the integrated starter-generator and the first shaft, and the rotor support of the main traction motor and the second shaft, the purpose of saving internal space of the hybrid electric drive unit is realized by the present invention, so that internal structures of the hybrid electric drive unit and drive system can be arranged more compactly and their internal connections can be more efficient and appropriate.

BRIEF DESCRIPTION OF THE DRAWINGS

Other features, objects and advantages of the present invention will become more apparent upon reading the following redundant description of non-limiting embodiments with reference to the accompanying drawings:

FIG. 3 illustrates an operating mode table of a hybrid drive system according to a preferred embodiment of the present invention.

REDUNDANT DESCRIPTION OF THE INVENTION

Figure 1:
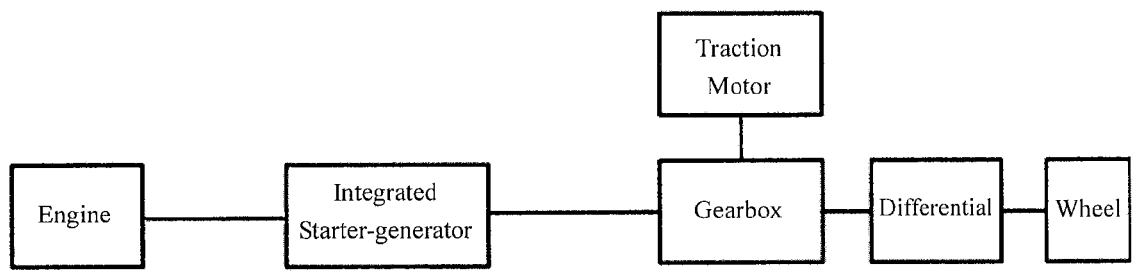
FIG. 1 illustrates a principle diagram showing connection relationships among components in a drive system of hybrid vehicle according to a specific embodiment of the present invention.

FIG. 1 illustrates a principle diagram showing connection relationships among components in a drive system of hybrid vehicle according to a specific embodiment of the present invention. It illustrates connection relationships among the engine 1, the wheel 20, the electric drive unit including the first motor 2 and the second motor 3, differential 4 and the other components of a hybrid vehicle applied with the hybrid drive system of the present invention, wherein the engine 1 and the electric drive unit comprise the hybrid drive system of the present invention. Preferably, the first motor 2 is a main traction motor of the hybrid vehicle of the present invention, and the second motor 3 is an integrated starter-generator. Specifically, the engine 1 is connected to the electric drive unit, through which hybrid power is transmitted to the wheel 20 via the differential 4. The specific connection manner and operating modes will be described in detail in the following specific embodiments, and thus redundant description is not provided herein. Those skilled in the art will understand that a conventional vehicle typically consists of four basic portions, i.e. an engine, a chassis, a vehicle body and electric equipments, while the hybrid drive system provided by the present invention comprises three power sources of hybrid vehicle (i.e. the main traction motor 2, the integrated starter-generator 3 and the engine 1) and some structures of vehicle chassis and electric equipments, so as to realize some functions of engine, chassis and electric equipments of the conventional vehicle, which are equivalent to power system, chassis and electric equipments of hybrid vehicle. Specifically, those skilled in the art can make reference to other related power system, chassis, vehicle body and electric equipments, etc. in the current existing technology so as to ensure that the hybrid drive system and the corresponding electric drive unit match with other components to construct a hybrid vehicle, and redundant description is not provided herein.

Further, the hybrid electric drive unit provided by the present invention also realize a shifting among a neutral gear, a first gear and a second gear of hybrid vehicle, and enables the hybrid drive system to accommodate operational requirements under various road conditions without the need to match with an engine and a main traction motor with high performance, making the hybrid vehicle better conform to practical requirements. The specific operation principle will be discussed in detail in the embodiments of the present invention and redundant description is not provided herein.

Figure 2:
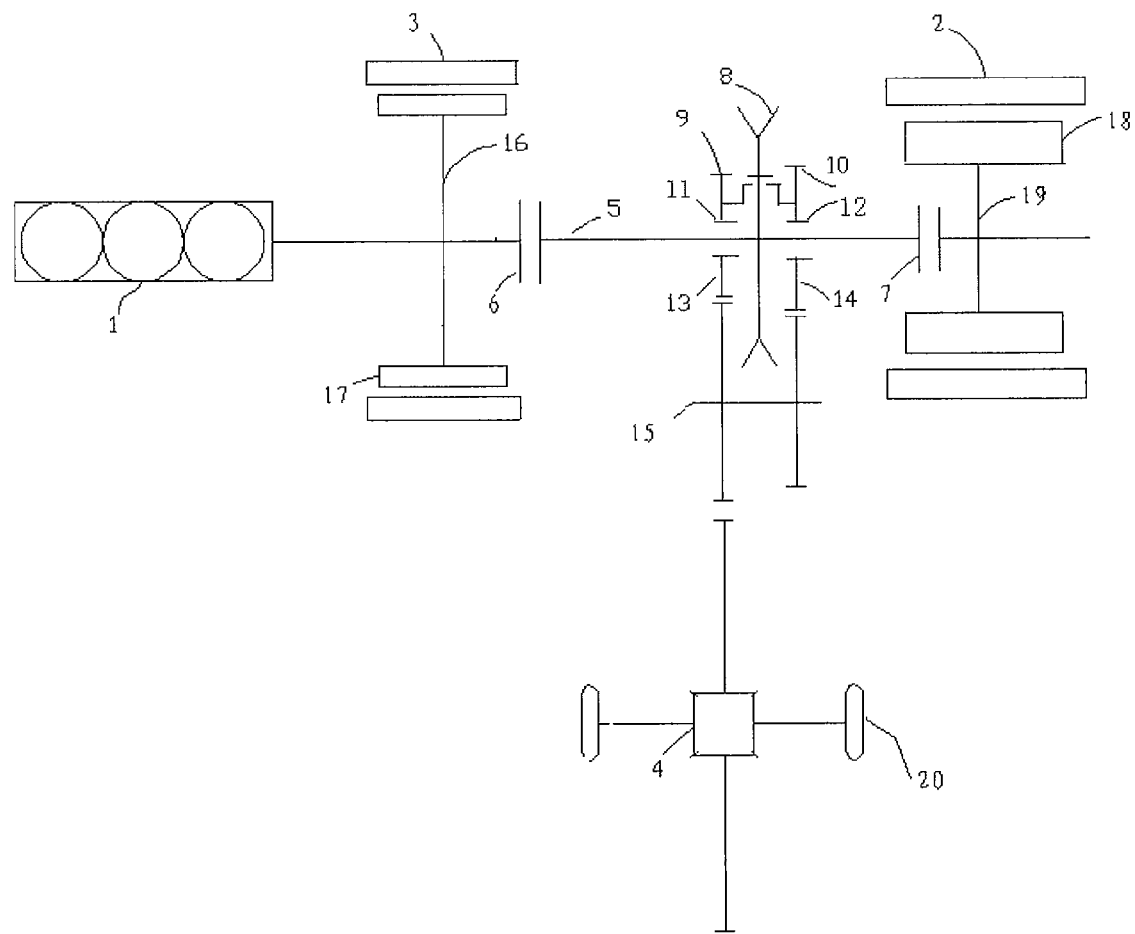
FIG. 2 illustrates a schematic diagram of a hybrid drive system according to a preferred embodiment of the present invention.

FIG. 2 illustrates a schematic diagram of a hybrid drive system according to a preferred embodiment of the present invention, and it illustrates a detailed mechanical connection manner of various components of the drive system. This specific embodiment will be described hereinafter by taking FIG. 2 as an example, wherein the hybrid drive system comprises a main traction motor 2, an integrated starter-generator 3, an engine 1, a first shaft (main shaft) 5, a first stage decelerating device 9, a second stage decelerating device 10, a first clutch 6, a second clutch 7 and a synchronizer 8. Specifically, a drive disc of the first clutch 6 is connected to the integrated starter-generator 3 and the engine 1 of vehicle, a driven disc of the first clutch 6 is connected to the first shaft 5, a drive disc of the second clutch 7 is connected to the main traction motor 2, and a driven disc of the second clutch 7 is connected to the first shaft 5. The hybrid electric system outputs power via the first stage decelerating device 9 or the second stage decelerating device 10. The synchronizer 8 is slidably arranged on the first shaft 5, and the first shaft 5 is connected to the first stage decelerating device 9 or the second stage decelerating device 10 via the synchronizer 8. The first stage decelerating device 9 or the second stage decelerating device 10 is connected to the differential 4 through which power is transmitted to the wheel 20. Those skilled in the art will understand that, the synchronizer 8 is splined with the shaft 5 and it can rotate with the first shaft 5 together and slide on the first shaft 5. Such structure and rotating mechanism can be realized by those skilled in the art when they combine the existing technology, and redundant description is not provided herein.

Preferably, the drive disc of the first clutch 6 is connected to the engine 1 and the rotor support 16 of the integrated starter-generator 17; preferably, in this embodiment, a portion of the drive disc that is near the center is directly connected to the engine 1, and accordingly, the drive disc of the first clutch 6 is connected to the rotor support 16 of the integrated starter-generator at its edge away from the center. The driven disc of the first clutch 6 is connected to one end of the first shaft 5; preferably, in this specific embodiment, the central portion of the driven disc is connected to the first shaft 5.

Accordingly, the drive disc of the second clutch 7 is preferably connected to the support 19 of the rotor 18 of the main traction motor 2. The driven disc of the second clutch 7 is connected to one end of the first shaft 5; further, in this specific embodiment, the central portion of the driven disc is preferably connected to the first shaft 5.

As shown in FIG. 2, the first stage decelerating device 9 comprises a first gear drive gear 13 and a first gear driven gear, wherein the first gear drive gear 13 is rotatably arranged on the first shaft 5, and the first gear drive gear 13 can be engaged with the synchronizer 8 to transmit power from the first shaft 5 to the first gear drive gear 13, and the first gear drive gear 13 is engaged with the first gear driven gear so as to achieve the purpose of realizing first stage deceleration. The first gear driven gear of the first stage decelerating device 9 is finally connected to the differential 4 through which wheels are driven to rotate.

Accordingly, the second stage decelerating device 10 comprises a second gear drive gear 14 and a second gear driven gear, wherein the second gear drive gear 14 is rotatably arranged on the first shaft 5, and the second gear drive gear 14 can be engaged with the synchronizer 8 to transmit power from the first shaft 5 to the second gear drive gear 14, and the second gear drive gear 14 is engaged with the second gear driven gear so as to achieve the purpose of realizing second stage deceleration. The second gear driven gear of the second stage decelerating device 10 is finally connected to the differential 4 through which wheels are driven to rotate.

With further reference to FIG. 2, in a preferred embodiment of the present invention, the hybrid drive system of the present invention is also provided with a second gear shaft 15 which connects a first gear driven gear of the first stage decelerating device 9 with a second gear driven gear of the second stage decelerating device 10 together. A differential 4 is connected to the first gear driven gear of the first stage decelerating device 9. As shown in FIG. 2, for example, a synchronizer 8 is engaged with the second stage decelerating device 10 when the second stage decelerating device 10 is used for deceleration. The second gear driven gear of the second stage decelerating device 10 drives the first gear driven gear of the first stage decelerating device 9 to rotate via the second gear shaft 15, and engages with the differential 4 via the first gear driven gear so as to eventually drive wheels to rotate. Accordingly, the first gear drive gear 13 performs idle on the shaft 5.

Of course, those skilled in the art will understand that the differential 4 may be provided to be engaged with the second gear driven gear, or an intermediate gear (not shown) is further provided on the second gear shaft 15. Such an intermediate gear can be, for example, preferably disposed between the first and second gear driven gears, and this intermediate gear is engaged with the differential. Under these circumstances, its working principle is basically identical with the aforesaid contents and therefore redundant description is not provided herein.

Furthermore, in this embodiment, with reference to FIG. 2, the engine 1 and the integrated starter-generator 3 are connected to the drive disc of the first clutch 6 simultaneously. Those skilled in the art will understand that, such a design enables a power connection between the engine 1 and the integrated starter-generator 3 to be maintained, i.e., the engine 1 is connected to the integrated starter-generator 3 directly or via a torque coupling device, the engine 1 can output power to the integrated starter-generator 3, and the integrated starter-generator 3 can either generate electricity by using power output by the engine 1, or can output power together with the engine 1. The first shaft 5 is used to transmit power of each power source of the hybrid drive system. The hybrid drive system achieves power connection and disconnection between the engine 1 and the integrated starter-generator 3 and the first shaft 5, by controlling disengagement and engagement of the first clutch 6. Specifically, the driven disc of the first clutch 6 is connected to the first shaft 5 so that the hybrid drive system can control the engine 1 and the integrated starter-generator 3 to output mechanical power to the wheel 20 or not, by controlling disengagement and engagement of the first clutch 6.

The hybrid drive system achieves the control of power connection and disconnection between the main traction motor 2 and the first shaft 5 by controlling disengagement and engagement of the second clutch 7. Specifically, the driven disc of the second clutch 7 is connected to the first shaft 5, and the drive disc of the second clutch 7 is arranged on the rotor support 19 of the main traction motor 2. Those skilled in the art will understood that when the first clutch 6 and the second clutch 7 are closed at the same time, the output power of the engine 1, the integrated starter-generator 3 and the main traction motor 2 can be transmitted to the first shaft 5 and power coupling is realized. Thus, in this case three power sources of the present invention can simultaneously drive the first shaft to rotate. When the main traction motor 2 is used as a power source to drive vehicle, the power of the main traction motor 2 is transmitted to the first shaft via the closed second clutch 7 and drives the synchronizer 8 to rotate. Under the first gear condition, the synchronizer 8 slides on the first shaft 5 and makes one side of the synchronizer 8 engaged with the first gear drive gear 13 of the first stage decelerating device 9, whereby power is transmitted to the first gear driven gear via the first gear drive gear 13 and output via the differential 4 so that the first gear transmission is realized. Under the second gear condition, the synchronizer 8 slides on the first shaft 5 and makes the opposite side of the synchronizer 8 engaged with the second gear drive gear 14 of the second stage decelerating device 10, whereby power is transmitted to the second gear driven gear via a second gear drive gear 14, and output via the second gear shaft 15 eventually to the differential 4 and further output outwardly, so that the second gear transmission is realized.

Also, in the specific embodiments of the present invention, it may set the first gear as shown in the FIG. 2 to a low speed gear or a high speed gear according to the actual situation, the second gear to a high speed gear or a low speed gear accordingly. Hereinafter, the present invention will be further explained as the first gear is a low speed gear and the second gear is a high speed gear.

Further, in this embodiment, other components of the hybrid drive system except for the vehicle engine 1 and their connection manner constitute a hybrid electric drive unit corresponding to this embodiment. Referring to FIG. 2, the hybrid electric drive unit comprises the main traction motor 2, the integrated starter-generator 3, the differential 4, the first shaft 5, the first clutch 6, the second clutch 7, the synchronizer 8, the first stage decelerating device 9, and the second stage decelerating device 10. The first shaft 5 is connected to the integrated starter-generator 3 and the engine 1 of vehicle via the first clutch, and to the main traction motor 2 via the second clutch 7.

The hybrid electric drive unit outputs power outwardly via the first stage decelerating device 9 or the second stage decelerating device 10, and achieves the power connection or disconnection of the first shaft 5 with the different decelerating devices via the synchronizer 8. Specifically, connection manner of the electric drive unit can be conducted with reference to the hybrid drive system described in this embodiment and redundant description is not provided herein. Similarly, those skilled in the art will understand that, the hybrid drive unit according to this embodiment can be designed and manufactured as a separate operation component of hybrid vehicle. For example, it can be supplied to complete vehicle manufacturer as a separate component so as to realize a technical effect of integration.

Those skilled in the art will understand that when the hybrid drive system operates in the first gear mode, the output power will be decelerated by the first stage decelerating device 9 and then output; the output power has a large torque and small rotational speed, thus meeting operation requirements under such conditions as when the vehicle is starting, climbing and rapidly accelerating; whereas when the hybrid drive system operates in the second gear mode, the output power will be decelerated by the second stage decelerating device 10 and then output; the output power has a small torque and large rotational speed, thus meeting operation requirements under such conditions as when the vehicle is running at intermediate and high speeds. The specific operation manner and control mode will be described in detail hereinafter and redundant description is not provided herein. Further, the choice between two gear positions according to the hybrid drive system for vehicle provided by the present invention enables requirements on torque output and high speed running for hybrid vehicle to be met even when the requirements on the main traction motor 2 is properly lowered, and enables the range of operation conditions suitable for parallel drive operation of hybrid vehicle to be expanded; meanwhile, the operation efficiency of the main traction motor 2 is further optimized.

Further, the hybrid drive system may be also provided with a multiple stage decelerating device such as a third stage decelerating device, as long as the provided decelerating device can be engaged with or separated from the synchronizer 8 and connects to the differential 4 and wheel 20. It may make a reference to the first stage decelerating device 9 and the second stage decelerating device 10 for the arrangement of such a decelerating device, as long as when the synchronizer 8 is engaged with this decelerating device, the decelerating device can transmit the power from the power source to the wheels.

Further, in this embodiment, the first clutch 6 is preferably provided in the space formed by the rotor support 16 of the integrated starter-generator and the first shaft 5. With reference to FIG. 2, the drive disc of the first clutch 6 is provided in the space on the side adjacent to the engine 1 and is connected to the rotor support 16 of the integrated starter-generator, and the driven disc of the first clutch 6 is provided in the space on the side adjacent to the first shaft 5. Specifically, the arrangement and technical effect of the first clutch 6 can refer to the embodiment shown in above FIGS. 2 and 3, and redundant description is not provided herein.

Still further, in this specific embodiment, the moments of inertia of the rotor 17 and the rotor support 16 of the integrated starter-generator and the drive disc of the first clutch 6 can be preferably designed to be an equivalent to a conventional engine flywheel so that the conventional engine flywheel can be eliminated. Similarly, the arrangement thereof can refer to the embodiment shown in above FIG. 2 and redundant description is not provided herein.

Further, in this embodiment, the second clutch 7 is arranged in the space formed by the motor support 19 of the main traction motor and the first shaft 5. Specifically, with reference to FIG. 2, the drive disc of the second clutch 7 is connected to the motor support 19 of the main traction motor, and the driven disc of the second clutch 7 is connected to one end of the firs shaft 5. Meanwhile, the second clutch 7 in this embodiment can be arranged without increasing volume of the hybrid drive system provided by the present invention and altering the arrangement of other components of the hybrid drive system, which makes full use of the internal space of the hybrid drive system so that the hybrid drive system is designed to be more compact.

Further, in this specific embodiment, the first shaft 5, the first gear drive gear 13 and the second gear drive gear 14 are arranged coaxially in the hybrid drive system. The second gear drive gear 14 and the first gear drive gear 13, which adopt free gear, are arranged in turn on the first shaft 5 and by means of, for example, a first gear needle roller bearing 11 and the second gear needle roller bearing 12, supported on the first on the shaft 5, which does not have an influence on substantive content of the present invention and redundant description is therefore not provided herein.

Further, in this specific embodiment, the driven disc of the first clutch 6 is preferably connected to one end of the first shaft 5 via a spring damper. Those skilled in the art will understand that the driven disc of the first clutch 6 can also be connected to the first shaft 5 via other elastic devices, as long as the technical object of shock absorbing can be achieved and thus redundant description is not provided herein.

Further, the first clutch 6 and the second clutch 7 provided by this embodiment are used in the form of a selection of dry clutch or wet clutch, i.e., the first clutch 6 can be a dry clutch or a wet clutch, and the second clutch 7 can also be a dry clutch or a wet clutch. In this embodiment, preferably, especially in case where the inner space is sufficient to place two dry clutches, both the first clutch 6 and the second clutch 7 are dry clutches. Less preferably, in case where the inner space is only sufficient to place one dry clutch and one wet clutch, one of the first clutch 6 and the second clutch 7 is a dry clutch and the other is a wet clutch; Even less preferably, especially in case where the inner space is not sufficient to place one dry clutch and one wet clutch, both the first clutch 6 and the second clutch 7 are wet clutches. Those skilled in the art will understand that a dry clutch is preferable, and redundant description is not provided herein.

Those skilled in the art will understand that, in the hybrid drive system provided by the present invention, the engine 1 is preferably an internal combustion engine, the main traction motor 2 is preferably a high-power main traction motor 2, and the integrated starting generator 3 is preferably a low-power integrated starting generator 3.

FIG. 3 illustrates an operation mode table of a hybrid drive system according to a preferred embodiment of the present invention. With reference to the above FIGS. 2 and 3, those skilled in the art will understand that when the hybrid drive system for vehicle is applied with the hybrid drive system provided by this embodiment, a switch among different operating states of the hybrid drive system can by realized via a clutch control system by controlling disengagement/engagement of the first clutch 6 and the second clutch 7, and via a complete vehicle control system by controlling disengagement/engagement operation and the synchronization operation of the synchronizer 8. The hybrid drive system for vehicle realizes power disconnection and connection between the hybrid drive system and the wheel 20 as well as gear position switch by disengagement/engagement of the first clutch 6 and the second clutch 7 and disengagement/engagement operation and the synchronization operation of the synchronizer 8. That is, when one of the first clutch 6 and the second clutch 7 is in engaged state and the synchronizer 8 is engaged with the first stage decelerating device 9 or the second stage decelerating device 10, the hybrid drive system can output power to the wheel 20; when the first clutch 6 and the second clutch 7 are in disengaged state, the hybrid drive system can not output power to the wheel 20; and when the hybrid drive system is shifting gears, the hybrid drive system can vary power-output torque. Correspondingly, the integrated hybrid vehicle control system could perform varieties of control functions, such as for the engine 1, the integrated starter-generator 3 and the main traction motor 2 on basis of requirements on driver's accelerator/brake pedal input respectively, and can optimally select high efficient power source on basis of requirement on driver's power, so as to realize various operation modes for the hybrid vehicle. Specifically, in this embodiment, at least on basis of the architecture of the hybrid drive system for vehicle as shown in FIG. 2, the main traction motor 2 can be at least provided with a neutral gear parking mode, a stop-to-charge mode, a rapid acceleration and gear shift mode, a pure electric drive and gear shift mode, a hybrid parallel drive and gear shift mode, a charge-in-travelling series operation and gear shift mode, a charge-in-travelling parallel operation and gear shift mode, and a braking deceleration energy recycling mode, etc.

Further, those skilled in the art will understand that the hybrid drive system provided by this embodiment which is a preferred embodiment can realize a non-power gear shift function when shifting gear positions in various modes, thereby ensuring a synchronous disengagement/engagement control of the first clutch 6, the second clutch 7 and the synchronizer 8 during gear shift.

Specifically, the operating modes of this embodiment will be described respectively hereinafter:

1) When a vehicle applied with the hybrid drive system for vehicle is in the neutral gear parking mode, the three power sources of the hybrid drive system for vehicle, i.e., the engine 1, the main traction motor 2 and the integrated starter-generator 3 are disconnected from the wheel 20 in power transmission. In this mode, the first clutch 6, the second clutch 7 and the synchronizer 8 are controlled to the disengaged state, and the engine 1, the main traction motor 2 and the integrated starter-generator 3 are controlled to achieve stop operating. Those skilled in the art will understand that when the vehicle applied with the hybrid drive system for vehicle is in the neutral gear parking mode and therefore power sources of the hybrid drive system are disconnected from the wheel 20 in power transmission, a neutral gear parking function is realized and the motor and inverter are prevented from being damaged due to an overly high potential energy level when it is required to tow the vehicle because of vehicle failure.

2) When a vehicle applied with the hybrid drive system for vehicle is in the stop-to-charge mode, the integrated starter-generator 3 charges a battery pack of the hybrid vehicle by making use of power output by the engine 1 when the vehicle is stopped. In this mode, the first clutch 6, the second clutch 7 and the synchronizer 8 are controlled to the disengaged state, the complete vehicle controller controls the integrated starter-generator 3 to firstly enter an activation mode so as to perform ignition operation on the engine 1; then the integrated starter-generator 3 enters an electricity generating operating mode so as to charge the battery pack, and the main traction motor 2 does not operate. Those skilled in the art will understand that only when the complete vehicle controller detects the battery volume is overly low, e.g., when the vehicle is stopped for a long time period and the air conditioner is in the operating state, will it be necessary to enter the stop-to-charge mode.

3) When a vehicle applied with the hybrid drive system for vehicle is in the rapid acceleration and gear shift mode, the hybrid drive system uses power output by the engine 1, the integrated starter-generator 3 and the main traction motor 2 to collectively drive the vehicle to run and perform gear shift function. In this mode, the engine 1, the main traction motor 2 or the integrated starter-generator 3 are under controlled, and the first clutch 6, the second clutch 7 and the synchronizer 8 are further controlled to achieve either disengaged or engaged state, so as to achieve the first or second gear function of the hybrid drive system. Specifically, the first clutch 6 and the second clutch 7 are controlled to achieve the engaged state, the first gear function in this mode is achieved when the synchronizer 8 engages the first gear drive gear 13, and the second gear function in this mode is achieved when the synchronizer 8 engages the second gear drive gear 14. Those skilled in the art will understand that in case where the vehicle applied with the hybrid drive system for vehicle requires the rapid acceleration mode, when the power required for vehicle is larger than efficiency optimized power for the engine 1, the engine 1, the main traction motor 2 and the integrated starter-generator 3 collectively output power to drive the vehicle so as to maximize output power of the hybrid drive system.

4) When a vehicle applied with the hybrid drive system for vehicle is in the pure electric drive and gear shift mode, the hybrid drive system uses power output by the main traction motor 2 to drive the vehicle to run and perform gear shift function. In this mode, the main traction motor 2 is controlled to output power, the engine 1 is controlled to achieve stop operating, the integrated starter-generator 3 is determined to operate or stop operating according to actual situation, and the first clutch 6, the second clutch 7 and the synchronizer 8 are further controlled to achieve either disengaged or engaged state, so as to achieve the first or second gear function of the hybrid drive system. Specifically, only when the vehicle needs to be driven by the main traction motor 2, the second clutch 7 is engaged and the first clutch 6 is disengaged, and in this case the first gear function in this mode is achieved when the synchronizer 8 engages the first gear drive gear 13, and the second gear function in this mode is achieved when the synchronizer 8 engages the second gear drive gear 14. When the vehicle needs to be driven collectively by the main traction motor 2 and the integrated starter-generator 3, both the first clutch 6 and the second clutch 7 are engaged, and in this case the first gear function in this mode is achieved when the synchronizer 8 engages the first gear drive gear 13, and the second gear function in this mode is achieved when the synchronizer 8 engages the second gear drive gear 14.

Those skilled in the art will understand that when the power required by vehicle is lower than a driving power that can be provided by the main traction motor 2 and the volume of battery pack is enough, the main traction motor 2 will drive the vehicle alone, the battery pack provides electricity energy to the main traction motor 2, and the hybrid drive system outputs the power output by the main traction motor 2 to the wheel 20. Accordingly, when the power required by vehicle is lower than a driving power provided by the main traction motor 2 and the integrated starter-generator 3, and the volume of battery pack is adequate, the main traction motor 2 and the integrated starter-generator 3 can drive the vehicle collectively.

5) When a vehicle applied with the hybrid drive system for vehicle is in the hybrid parallel drive and gear shift mode, the hybrid drive system uses power output by the engine 1 and the main traction motor 2 or the integrated starter-generator 3 to drive the vehicle to run and perform gear shift function. In this mode, the engine 1 and one of the main traction motor 2 and the integrated starter-generator 3 (which is judged by the complete vehicle controller according to total efficiency) are controlled to perform power output, and the main traction motor 2 or the integrated starter-generator 3 are under controlled, and the first clutch 6, the second clutch 7 and the synchronizer 8 are controlled to achieve either disengaged or engaged state, so as to achieve the first gear or second gear function of the hybrid drive system. Specifically, both the first clutch 6 and the second clutch 7 are controlled to achieve the engaged state, the first gear function in this mode is achieved when the synchronizer 8 engages the first gear drive gear 13, and the second gear function in this mode is achieved when the synchronizer 8 engages the second gear drive gear 14. Those skilled in the art will understand that when the vehicle is normally running for a long distance, the engine 1 and one of the main traction motor 2 and the integrated starter-generator 3 collectively drive the vehicle, and the hybrid drive system outputs power from the engine 1 and one of the main traction motor 2 and the integrated starter-generator 3 to the wheel 20.

6) When a vehicle applied with the hybrid drive system for vehicle is in the charge-in-travelling series and gear shift mode, the hybrid drive system charges a battery pack of the hybrid vehicle by using power output by the engine 1, and uses power output by the first motor 17 to drive the vehicle to run and perform gear shift function. In this mode, the engine 1 is controlled to drive the integrated starter-generator 3 to perform electricity generating operation, the main traction motor 2 is controlled to perform power output operation, and the main traction motor 2 is controlled, and the first clutch 6, the second clutch 7 and the synchronizer 8 is controlled to achieve either disengaged or engaged state, so as to achieve the first or second gear function of the hybrid drive system. Specifically, the second clutch 7 is controlled to achieve the engaged state and the first clutch 6 is controlled to achieve the disengaged state, the first gear function in this mode is achieved when the synchronizer 8 engages the first gear drive gear 13, and the second gear function in this mode is achieved when the synchronizer 8 engages the second gear drive gear 14. Those skilled in the art will understand that when the vehicle is running at a low speed for a long time period (e.g., in a crowed road condition), when the first clutch 6 cannot be engaged due to limitations of mechanical speed ratio and the lowest operation speed of the engine 1, the main traction motor 2 drives the vehicle, the integrated starter-generator 3 enters electricity generating mode, the electric energy required for the main traction motor 2 is provided by the integrated starter-generator 3 and the insufficient or residual part is provided or absorbed by the battery pack, and the hybrid drive system outputs power from the main traction motor 2 to the wheel 20.

7) When a vehicle applied with the hybrid drive system for vehicle is in the charge-in-travelling parallel and gear shift mode, the hybrid drive system drives the vehicle to run by using power output by the engine 1 and the main traction motor 2, and simultaneously charges the battery pack of the hybrid vehicle by using the integrated starter-generator 3 to generate electricity, and performance gearshift. In this mode, the engine 1 and the main traction motor 2 are controlled to output power, the integrated starter-generator 3 is controlled to perform electricity generating operation, and the main traction motor 2 or the integrated starter-generator 3 is under controlled, and the first clutch 6, the second clutch 7 and the synchronizer 8 are controlled to achieve either disengaged or engaged state, so as to achieve the first gear or second gear function of the hybrid drive system. Specifically, both the first clutch 6 and the second clutch 7 are controlled to achieve the engaged state, the first gear function in this mode is achieved when the synchronizer 8 engages the first gear drive gear 13, and the second gear function in this mode is achieved when the synchronizer 8 engages the second gear drive gear 14. Under this operation condition, the power portion of the engine 1 and the main traction motor 2 directly take part in driving together, and the other portions are used by the integrated starter-generator 3 to generate electricity for charging battery. Those skilled in the art will understand that only under certain operation conditions such as climbing for a long distance and when the battery is insufficient to provide power required by the main traction motor 2 due to limitations on power or energy, or when the torque provided by the main traction motor 2 is insufficient to drive the vehicle alone to overcome resistance, it will be required for the complete vehicle controller to control the hybrid drive system into this operating mode.

8) When a vehicle applied with the hybrid drive system for vehicle is in the braking deceleration energy recycling mode, it is determined by the vehicle controller that the integrated starter-generator 3 and/or the main traction motor 2 performs energy recycling via the first stage decelerating device 9 when the vehicle is braking, based on the disengaged/engaged state of the first clutch 6, requirement of braking power, electricity generating efficiency and allowable charging power of battery. In this mode, the main traction motor 2 and/or the integrated starter-generator 3 are controlled to generate electricity. Those skilled in the art will understand that when the vehicle applied with the hybrid drive system for vehicle is in the braking deceleration mode, a motor controller of the hybrid drive system controls the main traction motor 2 and/or the integrated starter-generator 3 to recycle energy when the vehicle is braking and charge the battery pack.

Specific embodiments of the present invention have been described above. It is understood that the present invention is not limited to the above-mentioned specific embodiments. Various variations or modifications can be made within the scope of appended claims by those skilled in the art without having an influence on the substantive content of the present invention.

What is claimed is:

1. A hybrid electric drive unit for vehicle, characterized in that it comprises a first motor, a second motor, a differential, a first shaft, a first stage decelerating device, a second stage decelerating device, a first clutch, a second clutch and a synchronizer, wherein a drive disc of the first clutch is connected to the second motor and an engine of the vehicle, a driven disc of the first clutch is connected to the first shaft, a drive disc of the second clutch is connected to the first motor, a driven disc of the second clutch is connected to the first shaft, the synchronizer is slidably arranged on the first shaft and can be engaged with the first or second stage decelerating device, the first and second stage decelerating devices can transmit power to the differential respectively, and the engine is connected to the second motor directly or via a torque coupling device.

2. The hybrid electric drive unit according to claim 1, characterized in that the first stage decelerating device comprises a first gear drive gear and a first gear driven gear engaged with the first gear drive gear, wherein the first gear drive gear is supported on the first shaft via a bearing, and the first gear driven gear can be engaged with the differential.

3. The hybrid electric drive unit according to claim 2, characterized in that the second stage decelerating device comprises a second gear drive gear and a second gear driven gear engaged with the second gear drive gear, wherein the second gear drive gear is supported on the second shaft via a bearing, and the second gear driven gear can be engaged with the differential.

4. The hybrid electric drive unit according to claim 3, characterized in that the first shaft, the first gear drive gear, the second gear drive gear, the first clutch and the second clutch are arranged coaxially.

5. The hybrid electric drive unit according to claim 3, characterized in that the hybrid electric drive unit further comprises a second shaft on which the first and second gear driven gears are arranged coaxially.

6. The hybrid electric drive unit according to claim 5, characterized in that the second shaft is further provided with an intermediate gear which is engaged with the differential, and arranged preferably between the first and second gear driven gears.

7. The hybrid electric drive unit according to claim 1, characterized in that the second clutch is arranged in the space formed by a rotor support of the first motor and the first shaft.

8. The hybrid electric drive unit according to claim 1, characterized in that the first clutch is arranged in the space formed by a rotor support of the second motor and the first shaft.

9. The hybrid electric drive unit according to claim 1, characterized in that the drive disc of the first clutch is directly connected to a rotor support of the second motor.

10. The hybrid electric drive unit according to claim 1, characterized in that the moments of inertia of a rotor and a rotor support of the second motor and the drive disc of the first clutch are equivalent to that of a conventional engine flywheel.

11. The hybrid electric drive unit according to claim 1, characterized in that the driven disc of the first clutch is connected to the first shaft via a spring damper.

12. A hybrid drive system for vehicle comprising at least an engine, characterized in that it further comprises a hybrid electric drive unit according to claim 1.

13. A control method for a hybrid drive system according to the preceding claim 12, characterized in that the control method at least controls a neutral gear parking mode, a stop-to-charge mode, a rapid acceleration and gear shift mode, a pure electric drive and gear shift mode, a hybrid parallel drive and gear shift mode, a charge-in-travelling series operation and gear shift mode, a charge-in-travelling parallel operation and gear shift mode, and a braking deceleration energy recycling mode.

14. The control method according to claim 13, characterized in that when a vehicle applied with the hybrid drive system for vehicle is in the neutral gear parking mode, i.e., the engine, the first motor and the second motor are disconnected from wheels in power transmission, and in this mode, the first and second clutches and the synchronizer are in disengaged state, and the engine and the first and second motors stop operating.

15. The control method according to claim 13, characterized in that when a vehicle applied with the hybrid drive system for vehicle is in the stop-to-charge mode, the second motor charges a battery pack of the hybrid vehicle by making use of power output by the engine when the vehicle is stopped, and in this mode, the first and second clutches and the synchronizer are in disengaged state, the engine is in operation, the second motor performs electricity generating operation, and the first motor stop operating.

16. The control method according to claim 13, characterized in that when a vehicle applied with the hybrid drive system for vehicle is in the rapid acceleration and gear shift mode, the hybrid drive system uses power output by the engine and the first and second motors to drive the vehicle to run, and in this mode, the engine and the first and second clutches are in operation, the first and second clutches are in engaged state, and the synchronizer is controlled to engage with the first or second stage decelerating device so as to achieve the first or second gear shift function of the hybrid drive system.

17. The control method according to claim 13, characterized in that when a vehicle applied with the hybrid drive system for vehicle is in the pure electric drive and gear shift mode, the hybrid drive system drives the vehicle to run by using power output by the first motor, and in this mode, the first motor is in operation and the engine and the second motor stop operating, the first clutch is in disengaged state and the second clutch is in engaged state, and the synchronizer is controlled to engage with the first or second stage decelerating device so as to achieve the first or second gear shift function of the hybrid drive system.

18. The control method according to claim 13, characterized in that when a vehicle applied with the hybrid drive system for vehicle is in the pure electric drive and gear shift mode, the hybrid drive system drives the vehicle to run by using power output by the first and second motors, and in this mode, the first and second motors are in operation and the engine stop operating, the first and second clutches are in engaged state, and the synchronizer is controlled to engage with the first or second stage decelerating device so as to achieve the first or second gear shift function of the hybrid drive system.

19. The control method according to claim 13, characterized in that when a vehicle applied with the hybrid drive system for vehicle is in the hybrid parallel drive and gear shift mode, the hybrid drive system drives the vehicle to run by using power output by the engine and one of the first or second motor, and in this mode, the engine and the first or second motor are in operation, the first clutch is in engaged state, and when the first motor is in operation the second clutch is in engaged state and when the first motor stop operating the second clutch is in disengaged state, and the synchronizer is controlled to engage with the first or second stage decelerating device so as to achieve the first or second gear shift function of the hybrid drive system.

20. The control method according to claim 13, characterized in that when a vehicle applied with the hybrid drive system for vehicle is in the charge-in-travelling series operation and gear shift mode, the hybrid drive system charges a battery pack of the hybrid vehicle by using power output by the engine, the vehicle is driven by using power output of the first motor, and in this mode, the engine, the first and second motors are all in operation, while the first clutch is in disengaged state and the second clutch is in engaged state, and the synchronizer is controlled to engage with the first or second stage decelerating device, thus to achieve the first or second gear shift function of the hybrid drive system.

21. The control method according to claim 13, characterized in that when a vehicle applied with the hybrid drive system for vehicle is in the charge-in-travelling parallel operation and gear shift mode, the hybrid drive system drives the vehicle to run by using power output partially by the engine and partially by the first motor, the remaining power of the engine drives the second motor to generate electricity so as to charge a battery pack of the hybrid vehicle, and in this mode, the engine and the first and second motors are all in operation, the first and second clutches are in engaged state, and the synchronizer is controlled to engage with the first or second stage decelerating device so as to achieve the first or second gear shift function of the hybrid drive system.

22. The control method according to claim 13, characterized in that when a vehicle applied with the hybrid drive system for vehicle is in the braking deceleration energy recycling mode, the second motor and/or the first motor perform energy recycling when the vehicle is braking, and in this mode, the first motor and/or the second motor are controlled to generate electricity.

* * * * *